Jan. 13, 1942.  F. E. DULMAGE  2,270,187
MACHINE FOR DRAWING AND TRIMMING THERMOPLASTIC CONTAINERS
Filed Oct. 4, 1940

INVENTOR
FREDERICK E. DULMAGE
BY
Griswold & Burdick
ATTORNEYS

Patented Jan. 13, 1942

2,270,187

UNITED STATES PATENT OFFICE 2,270,187

MACHINE FOR DRAWING AND TRIMMING THERMOPLASTIC CONTAINERS

Frederick E. Dulmage, Midland, Mich., assignor to The Dow Chemical Company, Midland, Mich., a corporation of Michigan Application October 4, 1940, Serial No. 359,774

2 Claims. (Cl. 18—19)

This invention relates to a machine for making drawn containers and the like from thermoplastic organic films, and for trimming said containers, all in a single operation.

Thermoplastic films have been drawn heretofore. It is an almost invariable result that the shaped article, when removed from the drawing device, has a fluted or ruffled edge which must be removed. The trimming of the ruffled edges of such containers has ordinarily constituted a separate operation.

It has been proposed, however, both to shape and trim such drawn articles in a single operation by means of a machine comprising the usual die and ram, in which the ram is provided with a slightly enlarged section above the working section thereof, forming a sharp-edged shoulder to cooperate with the edge of the die opening so as to cut off the formed piece after it has been shaped by the ram. Such a device suffers from the fault that with a given ram the depth of the cut-off article cannot be varied, and also has the further disadvantage that the adjustment of the diameter of the cutting-off section of the ram to that of the die opening is so fine that it can be easily disrupted by the expansion or contraction of the parts caused by variations in temperature during working. A slight contraction of the ram may cause it to slide in the die, without cutting off the work cleanly, while a slight expansion may cause it to jam in the die or to strike on the edge of the die opening with consequent damage to the machine.

It is accordingly among the objects of the present invention to provide a machine for making drawn containers and the like from thermoplastic organic films and for trimming said containers all in a single operation, without the requirement for such precise temperature control as has heretofore been necessary in machines of this character. Another object is to provide a machine of the type above mentioned, which machine is not limited as to the variety of depths of articles which can be drawn therein. Other and related objects will appear hereinafter.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but several of the various ways in which the principle of the invention may be used.

In the said annexed drawing—

Figures 1, 2, 3:
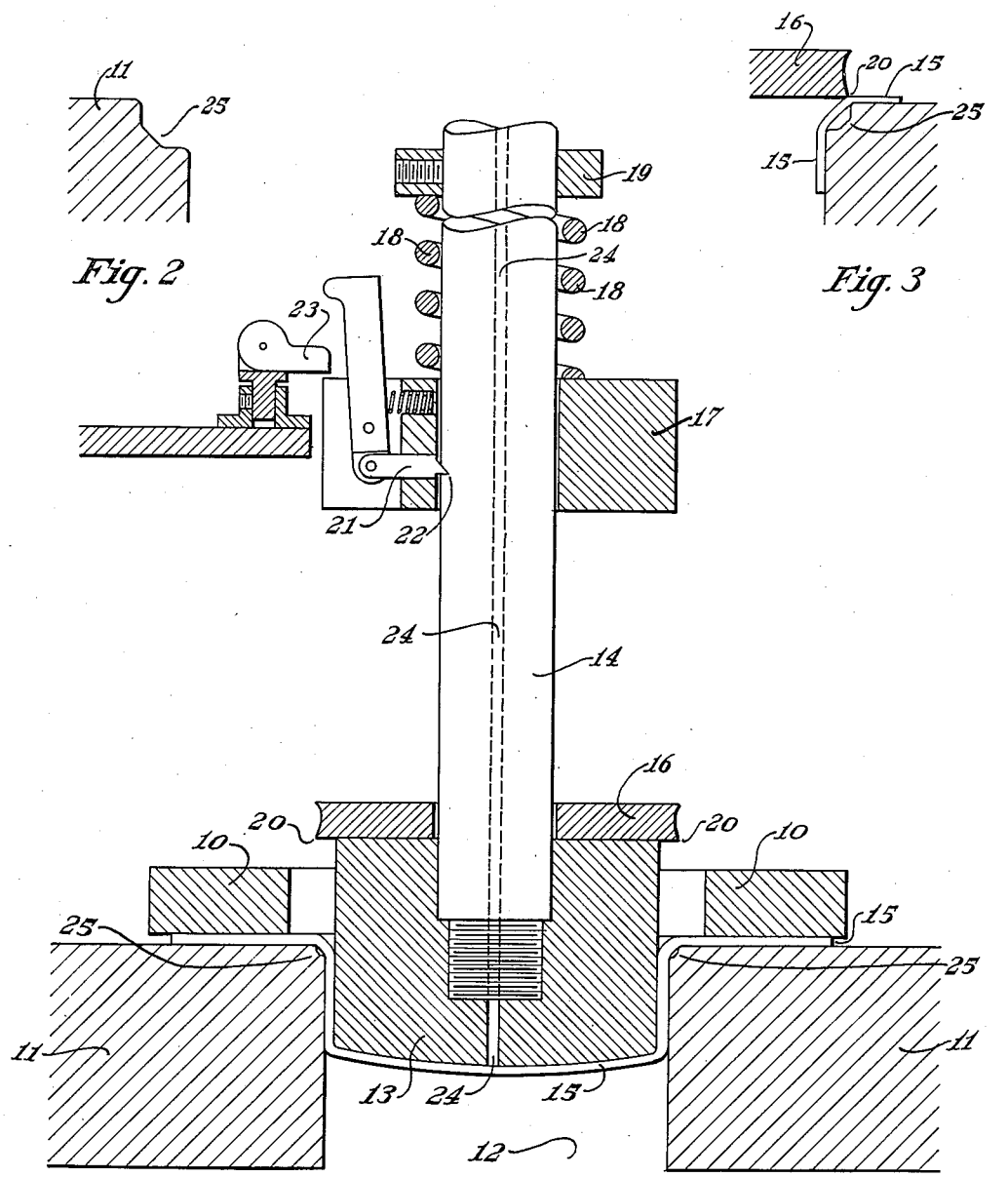
Fig. 1 is a view in typical vertical section of one modification of a machine whereby the foregoing objects may be attained.
Fig. 2 is a detailed view in section of a particular modification of an element of the machine illustrated in Fig. 1.
Fig. 3 is a view in vertical section through a particular modification of the trimming edge and die member in said machine.

Referring now to the drawing, a vertically mounted shaft 14 carrying a plunger 13 which fits into the opening 12 of a female die 11 with only an amount of clearance equal to about twice the thickness of the film 15 to be drawn plus a factor of approximately 2 mils, is driven in a vertical direction by a press, not shown. A clamping ring 10, somewhat larger in internal diameter than, and concentrically disposed with respect to, the opening 12 in die 11, is provided for holding film 15 initially flat across the said opening 12. Sufficient pressure is applied to ring 10 in known manner, by means not shown, to resist the wrinkling of the film which ordinarily accompanies drawing operations, while still allowing film 15 to slide from beneath the ring 10 under the tension caused by the downward movement of plunger 13 into the die opening 12. Over the piston or plunger 13, and slidably mounted on shaft 14, is a knife 16, the function of which will be described hereinafter. Above knife 16 is hammer 17 releasably mounted on shaft 14. Above hammer 17 on shaft 14 is tension spring 18 held in position by stop 19.

The annular knife 16, having a sharpened cutting edge 20, slides freely on shaft 14 and is of such dimension that, when plunger 13 is lowered into opening 12 of die 11, the said knife rests on the shoulder points 25 of the die.

The hammer 17 is held on shaft 14 by pawl 21 which engages notch 22 so located that spring 18 is compressed between hammer 17 and stop 19. Pawl 21 is connected with a trip mechanism 23, which is adjustable as to height.

The shaft 14 and plunger 13 may be bored axially to provide a conduit 24 through which a blast of compressed air or other fluid may be driven to discharge the shaped article from the die at a suitable point in the cycle of operations.

In operation, plunger 13 is raised above the level of the heated die 11 and a suitably pre-cut blank of thermoplastic film 15 is clamped flat by means of ring 10 over the die aperture 12. Hammer 17 is mounted with respect to shaft 14 in the elevated position illustrated in Fig. 1. Plunger 13 is then lowered on the down stroke into aperture 12, plus drawing the film 15 into the die 11. The knife 16 rides downwardly on plunger 13 until it rests on the shoulders 25 of die 11. As the plunger 13 is lowered further, the trip mechanism 23 releases pawl 21 from notch 22 and the hammer 17 is propelled by spring 18 to strike the knife 16. The film 15 is thus cut between the knife edge 20 and the shoulder point 25 of die 11 and the fringe of the film blank remaining under clamping ring 10 is thus severed from the shaped portion of the film. The plunger 13 continues its downward path until it has passed completely through aperture 12 at which time the shaped container is easily removed, suitably with the aid of an air blast directed through the conduit 24. At the same time, spring 18 is compressed against hammer 17 by the downward motion of stop 19 until pawl 21 again engages notch 22. At this point plunger 13 is raised on the return stroke once more above the level of die 11 carrying with it knife 16, and the machine is ready for another cycle of operations.

Fig. 2 shows a preferred form of the "shoulder point" or rim 25 of die 11. The shape of shoulders 25 illustrated in Fig. 2 prevents any score marks, made by the impact of the knife 16, from scratching the foil as it is drawn past the contact surfaces of die 11.

The die and co-acting ram and cutting member may be of any desired cross-sectional contour, to form round, oval, square, or other polygonal articles from thermoplastic films.

I claim:

1. A machine for drawing films and for trimming the drawn article, comprising a perforate drawing die and a drawing ram co-operative therewith to shape a thermoplastic film, a cutting member slidably mounted on the ram and having a cutting edge of the same peripheral contour as the ram and the die opening, positioned to engage the die to sever the film remnant disposed around said opening from the drawn film within the opening, a trip hammer slidable on and releasably engaged with said ram a predetermined distance away from the cutting member and on the side thereof away from said die, means for releasing the hammer from engagement with the ram when the latter has penetrated the desired distance into the die and the cutting member has come to rest on the film, and means for impelling the hammer against the cutting member and for holding the cutting member securely against the die during motion of the ram into the die after the drawn article has been trimmed.

2. A machine for drawing films and for trimming the drawn article, comprising a horizontally disposed drawing die with a vertical opening therethrough, a drawing ram co-operative therewith to shape a thermoplastic film, a cutting member slidably mounted on the ram and having a cutting edge of the same peripheral contour as the ram and die opening, positioned to engage the die to sever the film remnant disposed around said opening, a trip hammer slidable on and releasably engaged with said ram a predetermined distance above the cutting member, means for releasing the hammer from engagement with the ram when the latter has penetrated the desired distance into the die and the cutting member has come to rest on the film, and a spring, compressed when the ram and hammer are engaged, serving to propel the hammer sharply downward against the cutting member, and then to hold the cutting member securely against the die during motion of the ram into the die after the drawn article has been trimmed.

FREDERICK E. DULMAGE.